(No Model.) 2 Sheets—Sheet 1.

W. H. NOGAR.
SAW SHARPENER.

No. 494,021. Patented Mar. 21, 1893.

Witnesses
Harry L. Amer.

Inventor
W. H. Nogar.
By his Attorneys,
C. A. Snow & Co.

(No Model.) 2 Sheets—Sheet 2.

W. H. NOGAR.
SAW SHARPENER.

No. 494,021. Patented Mar. 21, 1893.

Witnesses
Harry L. Amer.

Inventor
W. H. Nogar.
By his Attorneys,
C. A. Snow & Co.

UNITED STATES PATENT OFFICE.

WILLIAM H. NOGAR, OF MOUNT JEWETT, PENNSYLVANIA.

SAW-SHARPENER.

SPECIFICATION forming part of Letters Patent No. 494,021, dated March 21, 1893.

Application filed September 7, 1892. Serial No. 445,230. (No model.)

*To all whom it may concern:*

Be it known that I, WILLIAM H. NOGAR, a citizen of the United States, residing at Mount Jewett, in the county of McKean and State of Pennsylvania, have invented a new and useful Gang-Saw Sharpener, of which the following is a specification.

My invention relates to a machine for sharpening "gang" saws, the object of the same being to attain rapidity and accuracy of dressing, and with this object in view the invention consists in a certain novel construction and arrangement of parts which will be clearly pointed out hereinafter in connection with the drawings and specifically defined in the appended claims.

Figure 1:
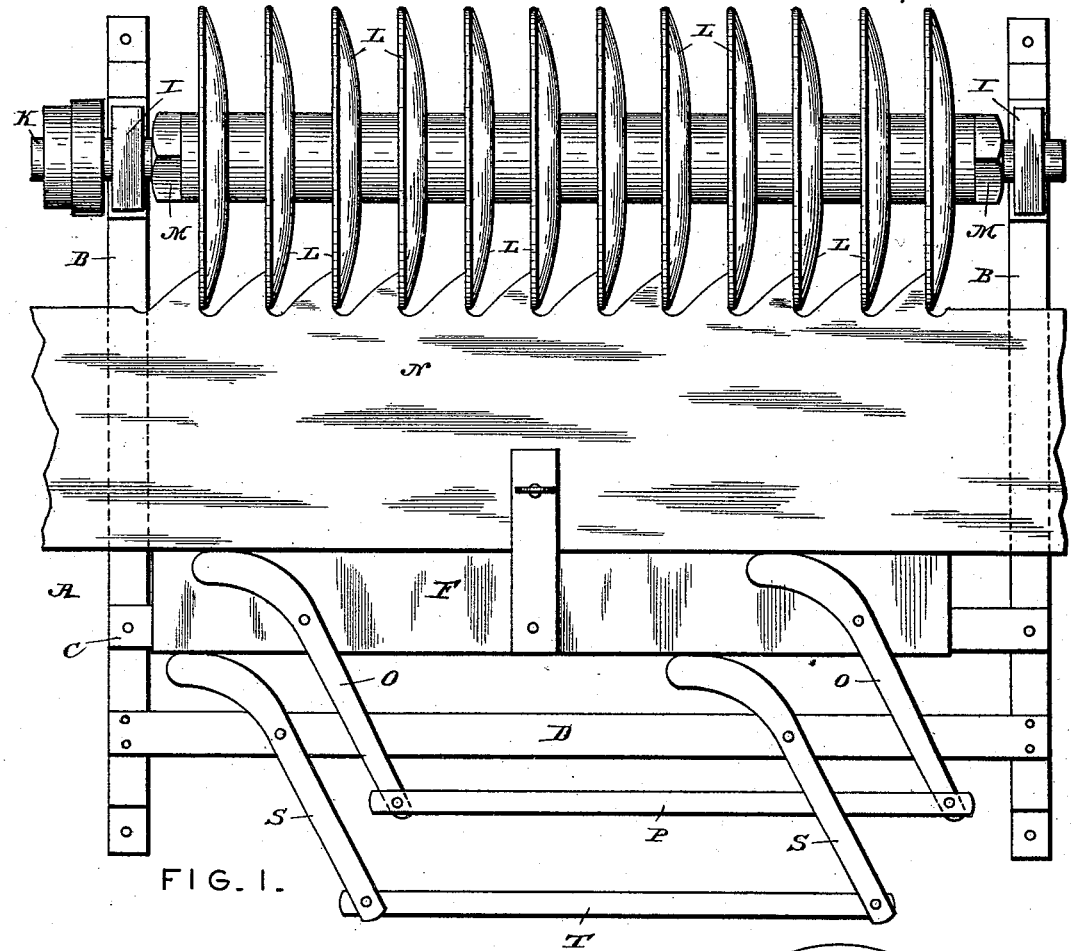
Figure 2:
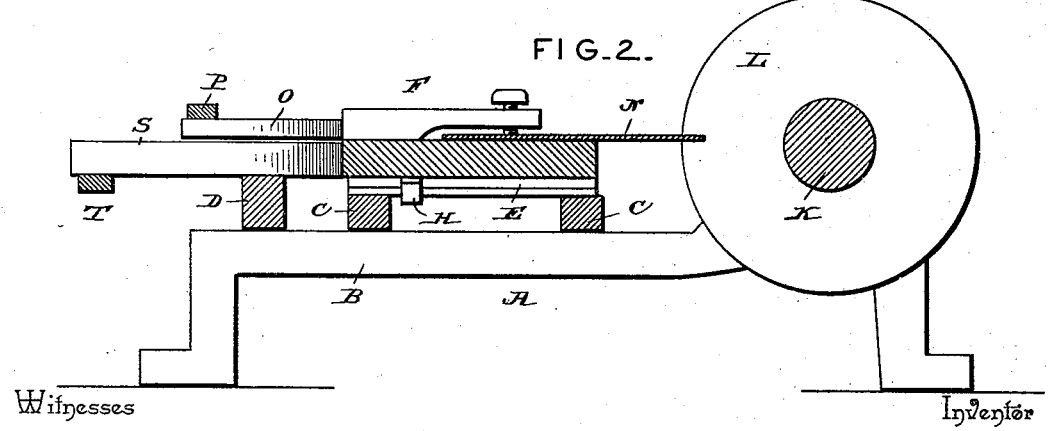
Figure 3:
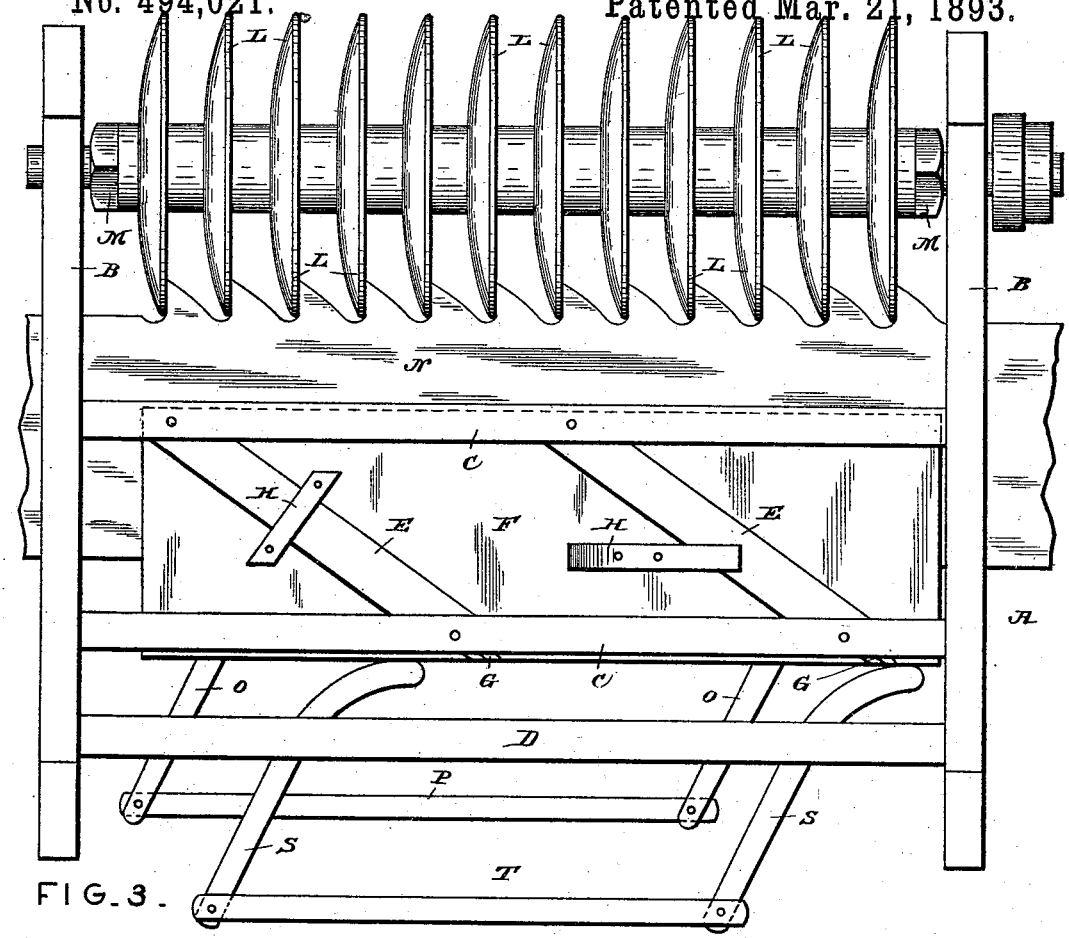
Figure 4:
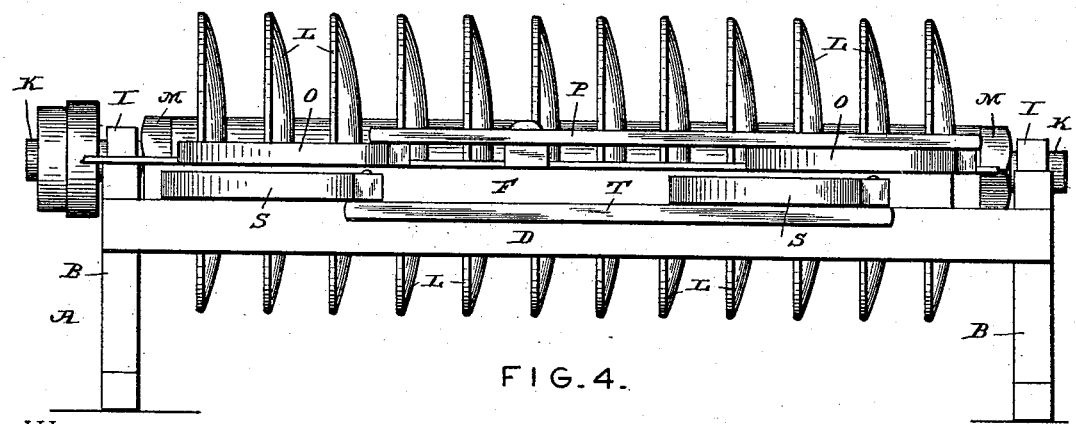

In the drawings: Figure 1 is a plan view of a machine embodying my invention. Fig. 2 is a vertical transverse sectional view of the same. Fig. 3 is a bottom plan view. Fig. 4 is a front view.

A represents the frame of the machine, comprising the side-pieces, B B, and the transverse connecting bars, C C and D, the latter being arranged adjacent to the front ends of the side-pieces.

The transverse bars, C C, carry the parallel, transversely-triangular guides, E E, upon which is mounted the saw-carriage, F, the under surface of the latter being provided with inclined guide-grooves, G G, to correspond with the inclination of the guides, E, whereby as the carriage is moved rearwardly it will also move laterally, as will be more fully explained hereinafter.

Guiding clips, H H, are attached to the underside of the carriage to engage the undersides of the guide-bars to hold the carriage in place thereon.

Mounted in opposite bearings, I I, near the rear ends of the side-pieces, is a shaft or arbor, K, carrying a series of emery-wheels, L L, and held in place thereon by the adjusting nuts, M M. These emery-wheels are cancavo-convex in shape, to correspond with the shape of the teeth upon the saw to be sharpened.

The saw, which is indicated at N, is carried by the carriage, and is fed against the sharpening wheels thereby, hence the use of inclined guides, whereby the side of each tooth of the saw may be pressed against the concave surface of its respective wheel.

Pivotally mounted upon the carriage, near its front edge are the cam-levers, O O, which are adapted to impinge at their heads against the rear edge or back of the saw to press it toward the sharpening-wheels, the free ends of said levers being connected by a rod, P, for simultaneous operation.

A pivoted catch, Q, is carried by the carriage, to swing over the back of the saw, and it is provided with an adjusting screw, R, to engage the saw and hold it firmly in place upon the carriage.

Pivotally mounted upon the transverse bar, D, are the operating levers, S S, provided with cam heads, similar to those upon the cam-levers, above described, to engage the front edge of the carriage and press it toward the sharpening wheels. These levers are also connected by the rod, T, for simultaneous operation.

Other means of operating the carriage and securing the saw in place thereon may be employed, without departing from the spirit of my invention.

The number of emery-wheels employed corresponds with the number of teeth upon the saw, whereby all of said teeth are operated upon simultaneously and equally.

Different shapes of disks may be employed to suit the shape of the teeth of the particular saw to be sharpened.

Having thus described my invention, what I claim, and desire to secure by Letters Patent of the United States, is—

1. In a machine for sharpening saws, the combination of the series of sharpening disks carried by a common arbor, the saw-supporting carriage, and the cam-levers fulcrumed upon the carriage to engage the back of the saw, substantially as specified.

2. In a saw-sharpening machine, the combination of the sharpening disks carried by a common arbor, the carriage mounted upon suitable guides, the cam-levers carried by the carriage, the pivotal clamp carrying a thumb screw to engage the saw-blade, and the operating levers mounted upon the frame of the machine to engage the carriage, substantially as specified.

3. In a saw sharpening machine the combination with the sharpening devices, the saw supporting carriage, the cam levers fulcrumed on the carriage to engage the back of the saw, and the adjusting levers arranged to engage the carriage to move it toward the sharpening devices, substantially as specified.

4. In a machine of the class described the combination with a framework, provided with inclined guides E, a slidable carriage mounted upon such guides, an arbor K, sharpening disks carried thereby and means to lock the saw upon the said carriage, of adjusting levers S S, pivotally connected to the framework and having cam faces to engage the rear edge of the carriage and a connecting bar T between the free ends of such levers, substantially as described.

In testimony that I claim the foregoing as my own I have hereto affixed my signature in the presence of two witnesses.

WILLIAM H. NOGAR.

Witnesses:
FRANK H. KREINER,
WM. E. SANDBORN.